United States Patent
Bouffay et al.

(10) Patent No.: US 9,321,394 B2
(45) Date of Patent: Apr. 26, 2016

(54) LED LAMP FITTED WITH A SAFETY DEVICE

(71) Applicant: Zedel S.A., Crolles (FR)

(72) Inventors: Boris Bouffay, Saint Bernard du Touvet (FR); Alain Maurice, Saint Hilaire du Touvet (FR)

(73) Assignee: Zedel S.A., Crolles (FR)

(*) Notice: Subject to any disclaimer, the term of this patent is extended or adjusted under 35 U.S.C. 154(b) by 0 days.

(21) Appl. No.: 14/020,074

(22) Filed: Sep. 6, 2013

(65) Prior Publication Data

US 2014/0009070 A1 Jan. 9, 2014

Related U.S. Application Data

(63) Continuation of application No. PCT/EP2012/000983, filed on Mar. 6, 2012.

(30) Foreign Application Priority Data

Mar. 7, 2011 (EP) .................................. 11368004

(51) Int. Cl.
*G05F 1/00* (2006.01)
*B60Q 1/14* (2006.01)
*H05B 33/08* (2006.01)
(Continued)

(52) U.S. Cl.
CPC ............... *B60Q 1/1423* (2013.01); *F21L 4/00* (2013.01); *F21V 14/00* (2013.01); *F21V 23/00* (2013.01); *F21V 23/0478* (2013.01); *F21V 25/00* (2013.01); *H05B 33/0818* (2013.01); *H05B 33/0854* (2013.01); *H05B 37/0227* (2013.01);
(Continued)

(58) Field of Classification Search
CPC ................................ G03B 13/02; G03B 17/00
USPC .............. 348/345, 346, 351, 370; 396/51–52, 396/153
See application file for complete search history.

(56) References Cited

U.S. PATENT DOCUMENTS

| 6,072,892 A | 6/2000 | Kim |
| 8,529,086 B2 | 9/2013 | Skrivan et al. |
(Continued)

FOREIGN PATENT DOCUMENTS

| CN | 101636076 | 1/2010 |
| CN | 101888495 | 11/2010 |
(Continued)

OTHER PUBLICATIONS

PCT International Search, PCT/EP2012/000983, Zedel S. A.
(Continued)

*Primary Examiner* — Minh D A
(74) *Attorney, Agent, or Firm* — Saile Ackerman LLC; Stephen B. Ackerman

(57) ABSTRACT

Lamp comprising
one or more LEDs:
A controllable power unit providing power supply to the LED lamps,
A control unit for adjusting the light generated by the lamp, wherein said control unit includes an image sensor generating images of the illuminated area of the lamp, and a processor for processing the images to detect the presence of an eye in a presumably dangerous area, said control unit generating a control signal for reducing the amount of light generated by the LED during the detection of a human face, in particular of an eye in said presumably dangerous area.

16 Claims, 6 Drawing Sheets

(51) Int. Cl.
  *H05B 37/02*   (2006.01)
  *F21V 23/04*   (2006.01)
  *F21V 25/00*   (2006.01)
  *F21V 14/00*   (2006.01)
  *F21V 23/00*   (2015.01)
  *F21L 4/00*    (2006.01)
  *F21Y 101/02*  (2006.01)

(52) U.S. Cl.
  CPC .............. *F21L 4/005* (2013.01); *F21Y 2101/02* (2013.01); *Y02B 20/341* (2013.01); *Y02B 20/44* (2013.01)

(56) References Cited

U.S. PATENT DOCUMENTS

| | | | |
|---|---|---|---|
| 8,850,742 B2 | 10/2014 | Dube | |
| 2006/0146284 A1* | 7/2006 | Collins et al. | 351/215 |
| 2007/0098391 A1 | 5/2007 | Howard et al. | |
| 2007/0182671 A1* | 8/2007 | Nathan et al. | 345/76 |
| 2008/0198586 A1 | 8/2008 | Man | |
| 2008/0204565 A1* | 8/2008 | Yumiki | 348/208.99 |
| 2010/0245614 A1* | 9/2010 | Matsunaga | 348/222.1 |
| 2011/0018990 A1* | 1/2011 | Komoto et al. | 348/116 |

FOREIGN PATENT DOCUMENTS

| | | |
|---|---|---|
| EP | 1952676 | 8/2008 |
| EP | 2075630 | 7/2009 |
| WO | WO 2009133309 | 11/2009 |

OTHER PUBLICATIONS

Chinese Search Report, 2012800124361, Mailed: Aug. 1, 2014.

* cited by examiner

LED LAMP FITTED WITH A SAFETY DEVICE

This application is a Continuation of PCT Application no. PCT/EP2012/000983, which was filed on Mar. 6, 2012.

TECHNICAL FIELD

The present invention relates to laps fitted with LED diodes, and in particular a LED headlamp having a device for limiting the brightness.

BACKGROUND

The use of LEDs (Light Emitting diodes) spreads in lighting devices because, on the one hand, their high power light but also their low power consumption.

Therefore, LEDs should be used not only for pocket lamps but also headlamps whose use is spreading to many as professional activities, as sports and leisure.

Regarding the headlamps, these lamps are intended for a "hands-free" use which should be efficient, comfortable and ensure maximum battery life.

However, this new type of lamps, because of the strong light emitted by the LED power is now likely to cause serious physical harm to users but also to third parties due to the high transmission power of the LEDs.

The present invention aims to remedy this situation.

SUMMARY

It is an object of the present invention to provide a lamp, such as a headlamp with light emitting diodes LEDs and with new features that can significantly increase the safe use of the latter.

It is another object of the present invention to provide a headlamp with a built-in protection mechanism designed to prevent any damaging glare for the user or any third party.

It is a third object of the present invention to provide a lamp and a method for controlling the power generated by the LEDs in accordance with the risk of glare.

These objects are achieved by means of a lamp comprising one or more LEDs, and a power unit which can be controlled for providing power to the LEDs. A control unit includes an image sensor generating images of the area illuminated by the lamp, which images are then processed to allow detection of the presence of a human face and particularly including an eye within an area suspected to be dangerous.

In response to that detection, the control unit generates a control signal transmitted to the power unit which then reduces significantly the amount of light generated by the LEDs so as to prevent damage to the eyes of the user or any third party.

In one embodiment, the control unit determines the relative area of a human face on the image sensed by said image sensor and performs a reduction of the intensity in accordance with the determined relative area.

Preferably, the control module includes a USB interface for the connection to a computer or a microcomputer.

In one particular embodiment, the decrease of the intensity of the light and the return to the normal intensity of the light is performed with distinct profiles under control of said control unit.

In one particular embodiment, there is provided an infrared sensor operating within a spectrum that is distinct from that of the light spectrum of the LEDs and which generates additional information to the control unit for controlling the light intensity of the LEDs.

In one particular embodiment, a reference image is stored within the memory accessible to the microprocessor in order to store an image of an authorized user of the lamp and to authorize the use of the lamp only after a comparison of the image captured by said sensor with said reference image.

The invention also achieves a method of limiting the light generated by a torch or a headlamp having one or more LEDs and a controllable power unit for powering the the LED lamps. The method comprises the steps of:

Capturing an image using an image sensor and processing such image so as to detect a human face and more specifically an eye which is likely to be located within an dangerous area, because being likely to receive high flux density bright, and In response to detection of an eye in said area, reducing the power emitted by the LEDs.

In one particular embodiment, the method comprises the following steps:

determination of the relative area of a human face on the image captured by said image sensor, and a reduction of the light intensity in accordance with said determined surface area.

In a particular embodiment, ,the decrease of the intensity of the light and the return to the normal intensity of the light is performed with distinct profiles under control of said control unit.

In a particular embodiment, the method further comprises the following steps:

storing a reference image within the memory accessible to the microprocessor corresponding to an authorized user of the lamp, and allowing the use of the lamp only after a comparison of such image with the image captured by the image sensor.

In another aspect, the invention achieves an illuminating lamp comprising:

one or more LEDs:

a controllable power unit providing for supplying current to the LEDs, a control unit for setting the intensity of the light generated by the lamp, an infrared sensor operating within a spectrum distinct from that used by the LED(s) for the detection of a human face, said control unit generating a control signal for reducing the amount of light generated by the LED(s) when detecting a human face.

Preferably the control unit includes a microprocessor-based architecture with memory for processing the information generated by the infrared detector.

At last, the invention achieves a method for limiting the light generated by a lamp comprising one or more LEDs and a power unit which can be controlled for the purpose of power the LEDs with current, said method comprising the steps:

detecting a human face by means of an infrared sensor operating in a spectrum which is distinct from that being used by the LEDs;

reducing the amount of light generated by the LEDs in response to said dtection.

In one particular embodiment, the method further involves the capture and the processing of an image, and the infrared sensor is used to quickly cause a decrease in light intensity, followed by a confirmation of the decrease in intensity resulting from a processing of the image captured by said image sensor.

The invention is particularly suitable for the realization of a lamp, and in particular a portable lighting lamp such as a headlamp.

BRIEF DESCRIPTION OF THE DRAWINGS

Other features, objects and advantages of the invention will become apparent upon reading the following description and drawings below, given by way of non-limiting examples. In the accompanying drawings.

DESCRIPTION

The examples will be described now are particularly suitable for the realization of a flashlight with LED diode power, including a headlamp.

Clearly, this is only one particularly embodiment and a man skilled in the art will be able to adapt the teaching of the invention to any other lighting device for the purpose of increasing safety in use.

For the purpose of illustrating the generality of the invention, three particularly embodiments will now be described in more details.

A first embodiment is described for achieving a cheap flashlight or a headlamp which includes a low-cost sensor based on an infra-red sensor (I).

In a second embodiment (II), the sensor is associated with a digital processing circuit based on a microprocessor.

In a third embodiment—the most sophisticated of the three—the infrared sensor is combined—or is replaced by—an electronic circuitry for capturing and processing images so as to improve the efficiency of the safety (III).

I. Description of a First Embodiment

Figure 1:
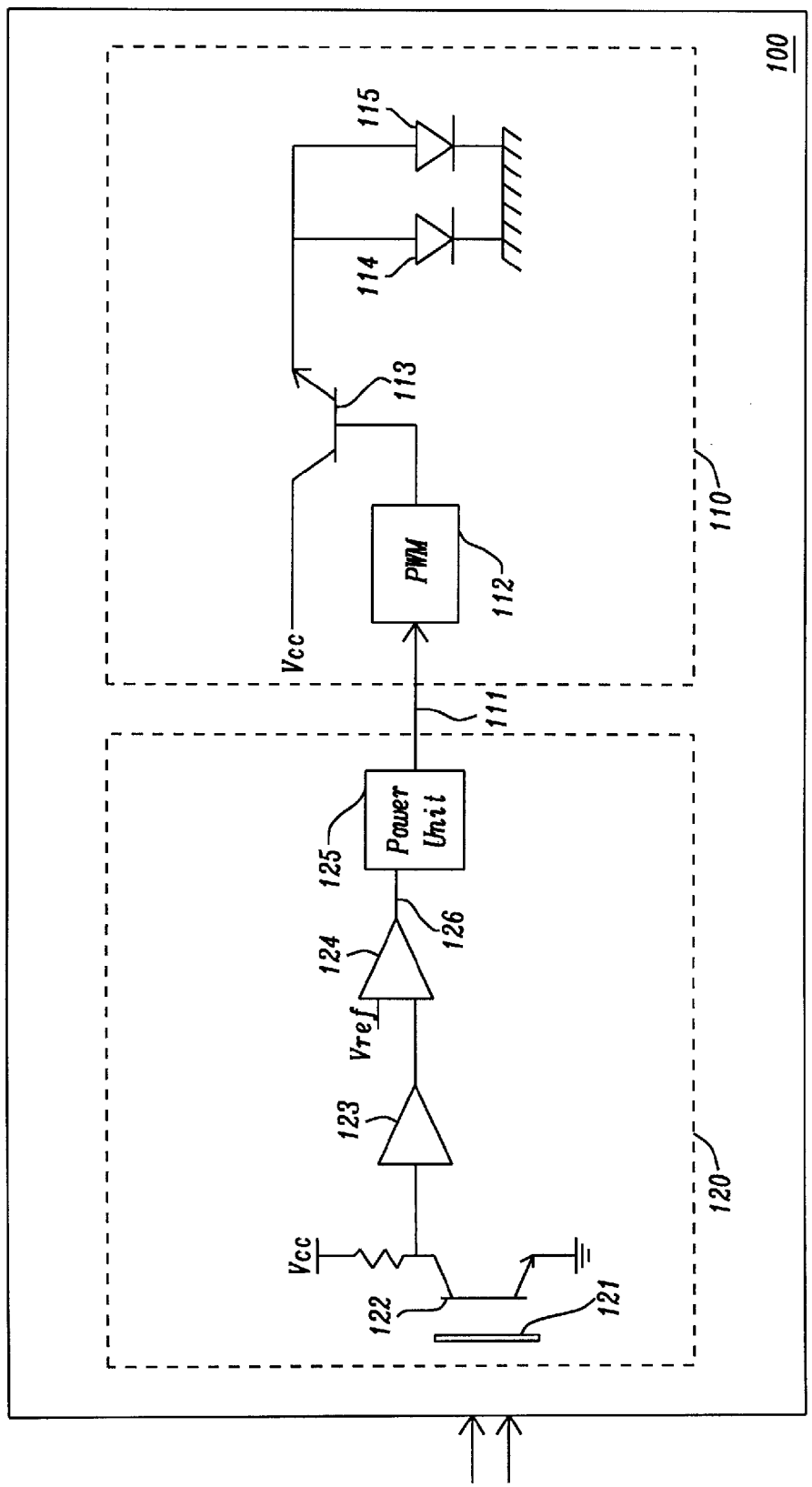
FIG. 1 illustrates a first embodiment of a lamp fitted with a safety system protecting against glare.

FIG. 1 shows the block diagram of a first embodiment of a lamp 100 comprising a power unit 110 associated with a control unit 120.

The power unit 110 specifically includes all components which are available in a conventional LED lamp for the purpose of producing a bright light beam/

The circuit includes a battery (not shown) generating a supply voltage Vcc, a set of LEDs (two diodes 114 and 115 are illustrated as an example) supplied by a power switch 113 being a semiconductor device of the type bipolar transistor, a FET (Field Effect Transistor) transistor or MOS (Metal oxide Secomiconductor) or MOSFET. For the purpose of reducing the Joule losses, switch 113 can be controlled by a Pulse Width Modulation well known to the skilled man and which is known in the Class D audio circuitry. This modulation is generated by means of a PWM control circuit 112 being under control, at its input 111, of a control signal.

Such components, switches and circuits are well known to the persons skilled in the art and it will be be necessary to burden the presentation by further developments regarding such modulation.

A control unit 120 generates the control signal which is transmitted to the input 111 of the power module 110 in order to control PWM circuit 112 for the purpose of controlling the intensity of light produced by the LEDs.

The control unit includes an infrared sensor 122 which is located behind a 121 optical system having a Fresnel lens adapted to focus on the infrared radiation emitted by the human body, and in particular a human face. FIG. 1 illustrates the use of a photosensor mounted in common emitter which provides a first voltage gain but one skilled in the art will readily understand that this is just a non limiting illustrative example. Alternatively, other circuits can be used for the purpose of sensing the infrared beam focused by the lens. In one particular embodiment, the beam will be captured within a cone having an angle of the order of 10 to 20 degrees around the lamp axis or the axis of the infrared sensor.

In one particular embodiment, the infrared sensor can be a Passive Infrared Sensor (PIS) type sensor produced by a crystalline component producing a surface electric charge when exposed to an infrared source. When subject to any variation of the infrared radiation, the sensor shows a variation of the electric charge, which can be measured by means of an Field Effect Transistor, for instance, or any appropriate circuitry.

Generally speaking, the signal which is captured by the sensor 122 is transmitted to a amplifier 123 providing, simultaneously, adequate amplification together with appropriate possible filtering so as to retain only the useful frequency components, without noise. In particular, it should be noted that the sensor is sensitive to a wide range of frequencies, and the captured signal will be filtered so as to retain only the radiation with a wavelength in the range 8 to 14 mm, which is particularly close to that of the human body.

The amplifier 123 thus generates an amplified and filtered analog component of the infrared radiation captured by element 122, which component is transmitted to a first input of a comparator 124 having a second input receiving a reference signal Vref. Comparator 124 generates an output signal which is transmitted via a terminal 126 to a control unit 125 which can process such signal so as to generate the control signal transmitted at the input 111 of PWM circuit 112.

Control unit 125 can be achieved in different ways.

In a particularly simple embodiment, the control unit includes adequate electronic circuitry for controlling a predefined decrease of the light generated by the LEDs upon detection of a infrared radiation above the threshold set by comparator 124.

In one particular embodiment, the reduction of the light intensity will be set at approximately 80-95 percent of the maximum luminous intensity, in order to avoid irreparable damage to the eye of a human subject.

Incidentally, one can set, by means of a monostable circuit available within control unit 125, a minimum period during which the decrease of brightness remain constant so as to avoid any interfering flickering.

Alternatively, an appropriate electronic circuit can be arranged for setting a first profile of reduction of brightness, then following by a second profile of increase of the light when the infrared source has ceased being opposite to the sensor 122.

It can thus be shown that the control unit includes an infrared sensor achieving infrared detection that is reliable enough to be used by the control unit 125 for generating the control signal transmitted to input 111 of PWM module 112.

One thus achieves a mechanism for limiting the power generated by the LEDs which is particularly advantageous and cheap.

If we already knew, with patent application WO2009FR00447 dated 16 Apr. 2009 (publication WO2009133309) filed by the assignee of the present application, a control circuit achieving the detection of the reflected light from the lamp in order to regulate the power, we can now observe that there is a quite fundamental different mechanism being very beneficial.

The control unit 120 of FIG. 1 differs from the previously known system in the following two aspects:

Firstly, the control unit 120 is designed to capture, not part of the light reflected from the illuminated object as was the case in the application WO2009FR00447, but the own radiation which is generated by any object, and particularly the radiation generated by a human face in the infrared spectrum.

Secondly, to ensure complete independence between (high) intensity beams generated by LED lamps and the (low) radiation emitted by the human face, one uses frequency spectra being especially different. In particular, one favours the use of an optical system and the LED generating a radiation lying in the blue or white and having no infrared radiation. It is therefore the radiation emitted by an object located in front of the lamp, including a human face, which will be detected by the infrared sensor.

In this way, the low IR radiation generated by a human face and sensed by infrared sensor 122 can be particularly advantageously useful.

Clearly, the reader will note that, if the user turns to a heat source, such as a fire or a wood stove, the infrared radiation emanating from those will likely cause a drop in LED brightness.

However, this drawback is acceptable in view of particular economic realization of the lamp (and such drawbacks will be solved in the second and third embodiment described hereinafter) and of little importance with regard the aim being considered, namely the preservation of the vision of a human subject. In addition, it should be noted that in some situations, a reduction of the brightness will ensure longer life of the battery, which will still be quite a useful effect, especially when the user will face a significant source of light and infrared radiation as for example, around a campfire.

Furthermore, in one particular embodiment, the safety mechanism can be disactivated.

As shown in the first embodiment, when the infrared sensor senses the emission of a infrared radiation which is superior than a predetermined threshold—set so as to correspond to the detection of a human face located at a distance which is approximately between 30 cm and 5 meters, the control unit generates a control signal to PWM unit so as to control a significant decrease in the luminous intensity of the LEDs.

Clearly, one can consider additional effects which can be combined with the drop in brightness. For example, referring to the contents of the patent application 06831147 (EP1952676 publication) entitled "ELECTRONIC ZOOM" it will be possible to automatically control the switching of a narrow beam to a wider beam so as to reduce the density of the luminous flux likely to hit the human retina.

As can be seen, an infra-red sensor can serve quite a number of different applications achieving, in all cases, a significant increase of the safety in the use of the lamp.

The first embodiment which has been described above is suitable for the realization of an economic lamp intended for mass production. As we have seen, very few components are required for achieving the detection, which can serve for effectively controlling the intensity of the light generated by the LEDs.

However, the second embodiment which will be now described will illustrate how advantageous it can be to achieve, at a same time, the infrared detection together with a signal processing by means of a microprocessor based digital architecture.

II. Description of a Second Embodiment: the Infra-red Sensor Embedded within a Microprocessor Based Architecture In the second embodiment that will now be described, and which is particularly illustrated in FIG. 2, a control unit 125—referenced 125'—is arranged with a microprocessor-based architecture.

The control unit indeed includes a CPU (Central Processing Unit) processor or a image processor 210 having access—via conventional address, data and control busses—to RAM memory 220, ROM (Read Only Memory) or EEPROM (Electrically Erasable Programmable Read Only Memory) for storing control and microprogram instructions and a input/output circuit 200 allowing interfacing with externals signals, in particular the output signal of comparator 125 on terminal 126 and also the control signal of module PWM 122 transmitted to terminal 111.

Optionally, control unit 125 has a USB (Universal Serial Bus) module 240 allowing the exchange of data via a standard serial interface 250 in accordance with the standard.

In this way, the control unit can communicate with a data processing device, such as a computer or laptop.

Such communication is especially useful for the exchange of configuration data, such as "profiles" useful for storing, as needded, data settings of the lamp in accordance with the desired use by its owner. In particular, the user can disengage the safety function through the interface of the lamp via the USB port.

In addition to the microcomputer 210, RAM 220, ROM 230, the control unit 125' can further includes buffering circuits, such as counters, supplemental registers well known to a skilled man, which will not require any further development.

As it can be seen, control unit 125 shows a more sophisticated form than the basic form which was described in relation to FIG. 1.

Figure 2:
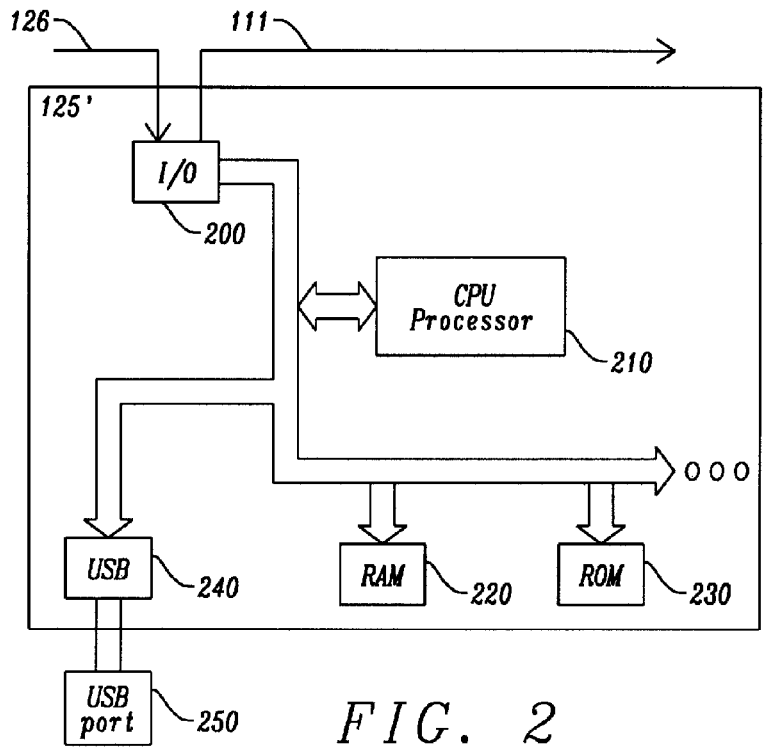
FIG. 2 illustrates a second embodiment of a lamp having a safety system based on a microprocessor.

However, because of the significant development of the microelectronic techniques, the on-going increased integration of the components of the silicon substrate and the significant decrease of manufacturing costs, the additional cost will be reasonable so that one may consider the possibility of embodying the electronic circuitries of the architecture of FIG. 2 even in low costs headlamps.

One may even consider, alternatively, the use of an digital infrared sensor for directly generating a digital information which can then, as for signal 126 of FIG. 2, be directly transmitted via circuit I/O 200 to the microprocessor.

Figure 4:
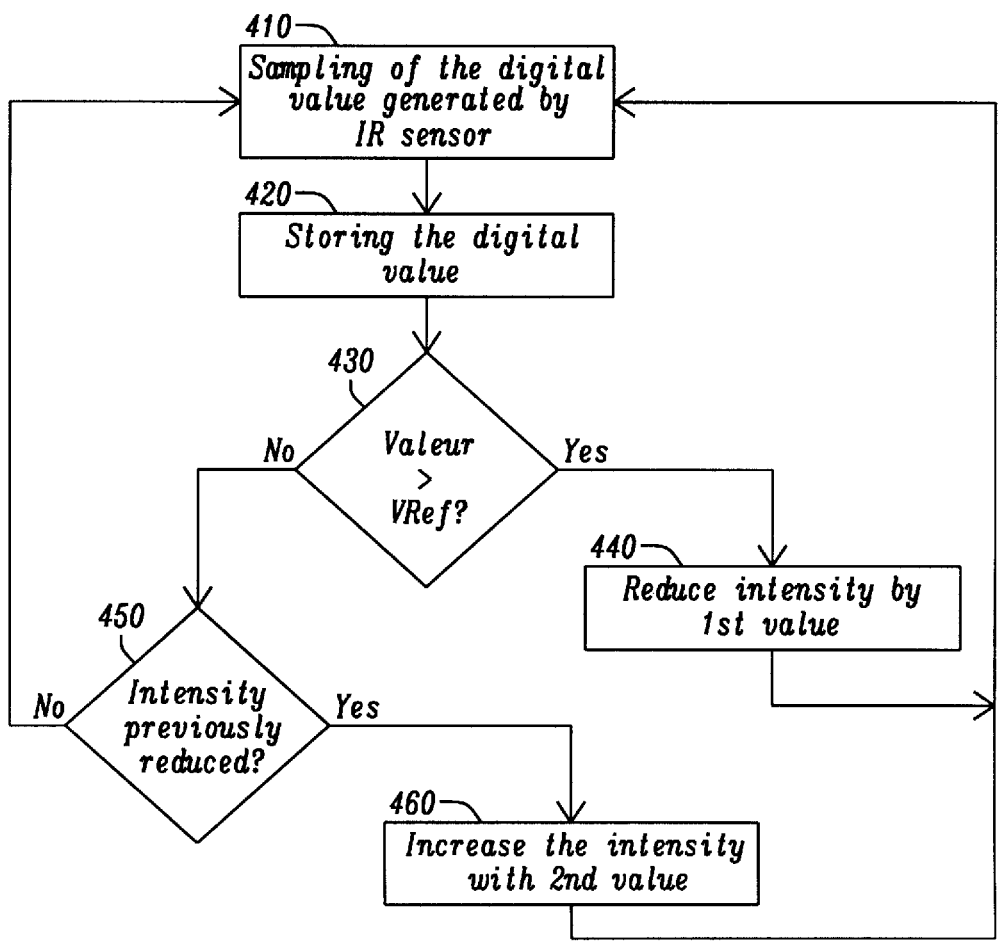
FIG. 4 illustrates a method using an infrared detection in order to secure the operation of the lamp illustrated in FIG. 1.

FIG. 4 is an example of the processing of the digital information generated by such a digital infrared sensor.

In a step 410, the processor 210 performs a sampling of the digital value generated by the infrared detector.

Then, in a step 420, the processor 210 performs the storage within RAM 220 of information, which information may usefully serve for intermediate computations, even for statistical calculations.

Then in a step 430, the processor performs a test, namely a comparison between the sampled value and a stored reference value stored in the RAM memory 220.

If the value that is generated by the infrared sensor exceeds the reference value, then the process proceeds with a step 440 during which processor 210 changes the value of the control signal 111 transmitted to the unit 112 so as to reduce by a first amount, for example 30%, the current generated by the diodes LEDs.

The method then returns to step 410 to start a new sample.

If, during the test of step 430, the value generated by the infrared sensor is less than the predetermined threshold, then the process proceeds with a step 450 at which a new test is performed so as to determine if, previously, the intensity of the light has already been reduced.

If the test of step 450 is negative, then the process goes back to step 410 for processing another sample.

On the contrary, if the test of step 450 shows to be positive, then the process proceeds with a step 460 during which processor 210 changes the value of the control signal 111 transmitted to the PWM unit 112 in order to increase, by a predetermined value which may be lower than the value of 30% mentioned above, the light generated by the LEDs.

The method then goes back to step 410 for the purpose of processing a new sample.

As it can be seen in this example of FIG. 4, one can thus achieve, very simply thanks to the process being described, the control of the lowering of the intensity of the light but also the return to "normal" operating conditions in accordance with different profiles.

In one particular embodiment, one will promote a "rapid drop" of the light intensity, upon detection of an infra-red radiation, so as to preserve the eyes of the user or a third party, and the "normal" operating condition will be reestablished only gradually as does the retina which accomodates quite differently when brightness significantly increases or decreases.

The architecture-based processor 210 thus achieves multiple new features and capabilities in the headlamp, which do not need to be further developped.

At last, in a third embodiment which will now be described hereinafter, the headlamp integrates a real unit for capturing and processing images thus allowing additional functions within the headlamp.

III. The Third Embodiment: the Image Sensor and Processing Unit

Figure 3:
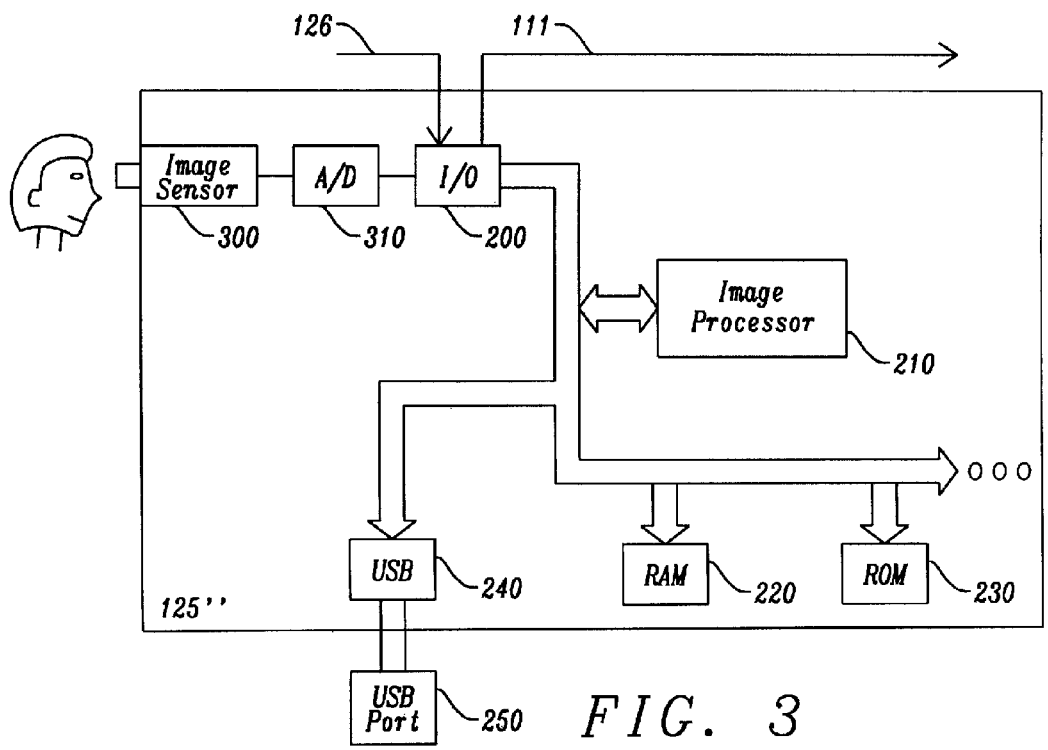
FIG. 3 illustrates a third embodiment of a lamp having a safety system including an image sensor.

FIG. 3 now illustrates a third embodiment that takes full benefit of the microprocessor based architecture which also incorporates an unit for capturing and processing images.

In order to facilitate the description, the elements being common with the control unit 125' will have the same numeric references.

In the third embodiment, the control unit takes the form of a unit 125" fitted with a processor 210 which may advantageously be a processor adapted for image processing, communicating via conventional address, data and control busses to RAM memory 220, to ROM and the input/output module 200 for interfacing with external signals. As an example, with information generated by the comparator 124 or, alternatively, with the digital information directly generated by the infrared sensor. As in the architecture of FIG. 2, the input/output module 200 generates the control signal transmitted to the input terminal 111 for the PWM module. USB port 250 is available via USB module connected to the bus.

Control unit 125" further comprises an image processing unit which is based on image sensor 300 being illustrated in FIG. 3 as an analog sensor, such as for example a video camera module or an analog camera module fitted with its optical system. The unit 125" further includes an analog-to-digital converter 310 for converting the analog signals which are generated by camera 300 into digital information which then be made available to the image processor 2010 through the input/output unit 200.

In one particular embodiment, a fully digital structure is being considered the units 300-310 will be replaced by a digital sensor, such as a CCD (Charge Coupled Device) sensor well known in the field of digital photography. A digital image, arranged in pixels—e.g. with a size 640×480 pixels—will then be directly available. Each pixel I (x, y) will be assigned a value representative of the brightness of the image or its color components.

In a preferred embodiment, the image sensor has an axis which corresponds to the axis of the LEDs so that the image sensed by sensor 300 coincides with the area illuminated by the latter.

In order to avoid that the axis of LED hits the retina of a user or any third party, the image processor 210 implements a computer program loaded within memory 230 and which prevents, as much as possible, that the user's eyes meet the axis of the projected beam.

Alternatively or in addition, one will also be capable to detect a human face and/or an eye. In a particular embodiment, the image processing performed by the control unit will lead to the calculation of the relative area of a face on the image arranged in pixels (eg 640×480 pixels), so as to generate a control signal function on this relative surface.

In a finer way, one can focus on the detection of an eye.

Figure 5:
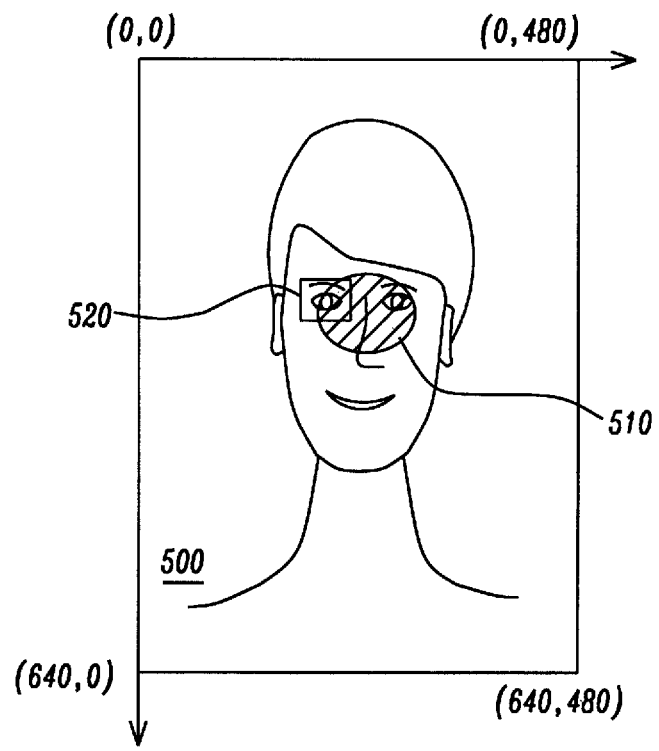
FIG. 5 shows a two-dimensional picture showing 480×640 pixels and which can be used for detecting an eye

FIG. 5 illustrates an example of an image arranged 480× 640 pixels representing a human face with two eyes. An area 510 is illustrated as being a dangerous area—concentrating a large amount of light rays—wherein the process which will now be described will cause, upon detection of an eye, a drastic reduction of the intensity of the lights generated by the Led.

Many algorithms are known to achieve the identification of an human eye, which algorithms can be grouped in features oriented methods or images based methods, and a skilled man will be able to adapt the algorithms which are available in accordance with the specifications required for the realization of a flashlight or headlamp.

Figure 6:
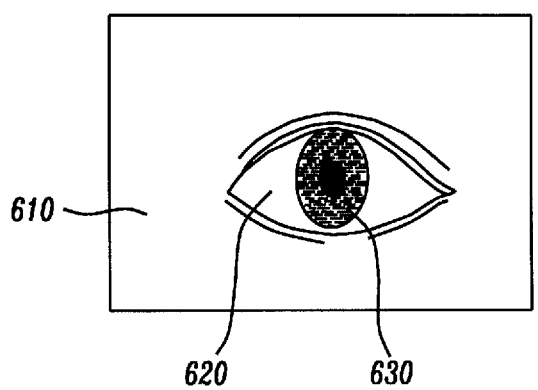
FIG. 6 illustrates a process for detecting an eye within a rectangle 520

One example is described in U.S. Pat. No. 6,072,892 issued Jun. 6, 2000 describing a method for detecting the position of an eye of a facial image based on the use of a threshold on the intensity histogram of the image for the purpose of detecting three peaks in the historigramme representative of the pupil of the skin and whites of the eye, each peak corresponding to the three zones 610, 620 and 630 as shown in FIG. 6.

Figure 7:
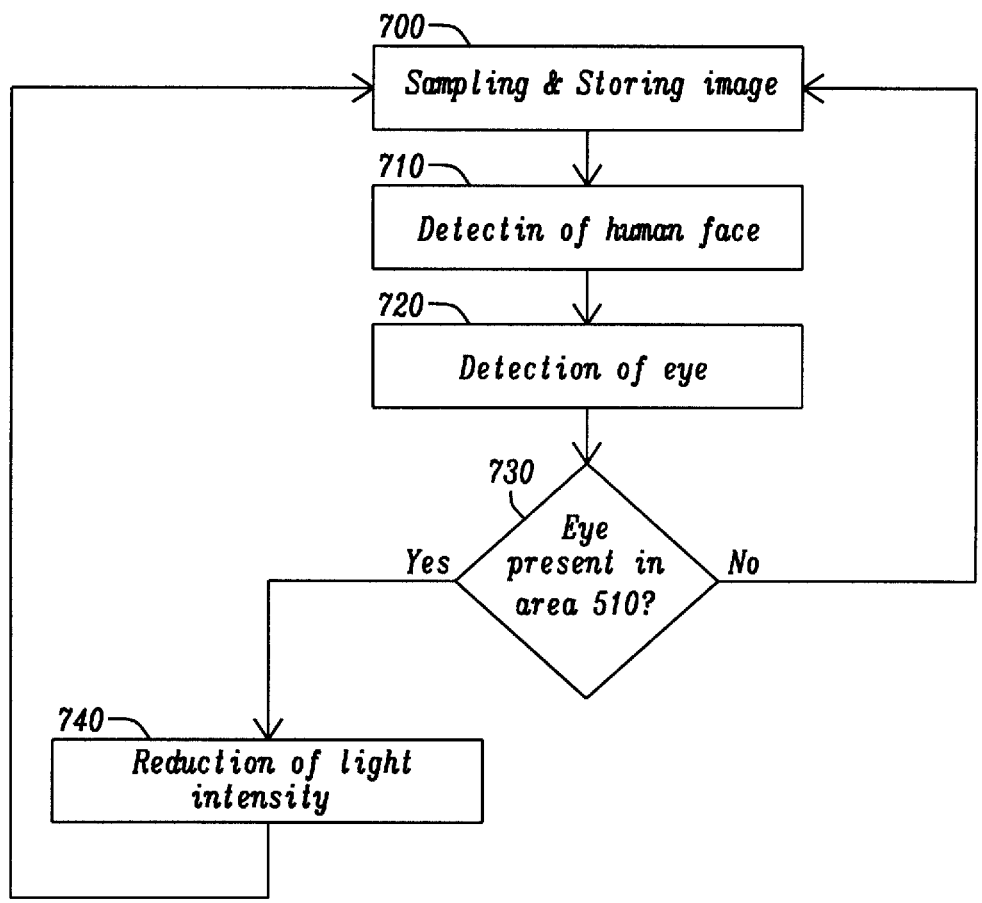
FIG. 7 illustrates a method for reducing the power generated by the LED in response to the processing of the image captured by the image sensor of FIG. 3.

FIG. 7 illustrates an embodiment of a method for reducing the amount of light generated by the LED.

The process starts with a step 700 where, at regular intervals, there is performed the sampling and the storing of an image generated by the image sensor.

Then, in a step 710, the process proceeds with the detection of a human face by means of the execution of an appropriate algorithm, such as, for example, based on research of an oval.

Then, in step 720, the process continues with a specific detection of a rectangular area, such that arez 520 of FIG. 5, which is likely to comprise one eye. To this end, one may use the process described in U.S. Pat. No. 6,072,892 or any other known process.

Then the process performs a test at step 730 to determine if the eye is detected within a presumably dangerous area 510.

If the test succeeds, indicating that one eye has been detected within the dangerous area, then the process proceeds with a step 740 where the processor generates a control signal transmitted via lead 111 to control unit PWM 112 so as to significantly reduce—for instance by 80 to 90 percent—the light intensity of LED diodes. The method then returns to step 700 for a new sampling operation.

If the test of step 730 leads to the conclusion that no eye has been detected, then the method returns to step 700 for a new sampling.

The process which was described above in connection with FIG. 7 can be sophisticated if wished so, or can even be combined with any algorithm for the purpose of providing additional functionalities.

In particular, the sensing of images can be very advantageously combined with the infrared detection that has been described in connection with the first and second embodiment.

Indeed, the infrared sensor allows a particularly fast detection of a human face whereas the image processing will ensure a great accuracy in the detection so as to eliminate the false detections.

The combination of the two effects will thus be particularly advantageous.

Figure 8:
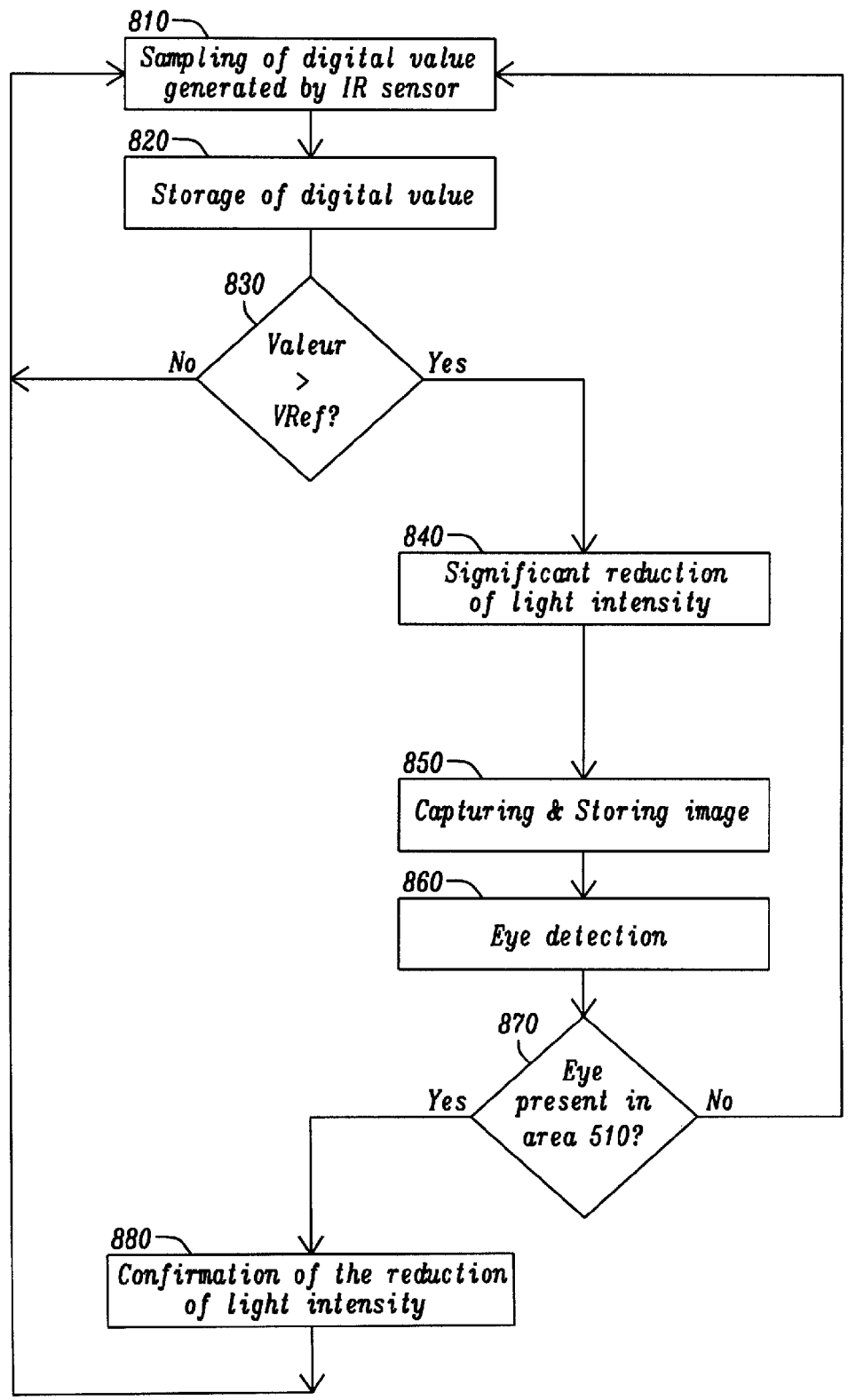
FIG. 8 illustrates a method combining infrared detection and image processing for the purpose of increasing safety in the use of the lamp.

FIG. 8 illustrates such a combination.

In a step 810, the process proceeds to a sampling of the digital value generated by the infrared sensor (possibly after analog-digital conversion if applicable).

This digital value is then stored into RAM storage in a step 820, in particular for use in intermediate calculations or for statistical purposes.

Then, the process proceeds to a test, in a step 830, consisting in a comparison of the stored value with a reference value Vref. It should be noted that the reference value can be a fixed predetermined value or possibly variable, depending in particular on the results of calculations made by the digital processor.

If the test fails, the process returns to step 810.

If the test of step 830 shows that the value issued by the infrared detector is superior than the reference value, the process then proceeds to a step 840 during where processor 210 generates a control signal on lead 111 so as to significantly reduce the amount of light generated by the LED.

Then the process proceeds to a step 850, being the capture and the storage of generated by image sensor 300.

The process then initiates starts a detection algorithm for detecting a human face in a step 860, and more specifically an algorithm for the purpose of detecting an eye in the image stored within memory.

The process then continues with a step 870 consisting in a test for determining whether an eye has been detected in the presumably dangerous area.

If the test of step 870 is positive, the process then proceeds to a step 880 consisting in the confirmation of the reduction of the light intensity which was determined in step 840. Alternatively, or additionally, one may implement any mechanism, such as, for example, referring to the patent mentioned above (ELECTRONIC ZOOM) a widening of the cone of light beam in order to reduce the density of luminous flux likely to hit human retina.

The process then returns to step 810 for a new sampling information detected by the infrared sensor.

As it can be seen, the infrared sensor can be particularly advantageously combined with a image detection process for the purpose of ensuring, on one hand, a high speed of detection and thus taking benefit, on the other hand, of the the accuracy provided by the digital processing.

Furthermore, the man skilled in the art will understand that the use of a digital processor will also provide new capabilities, allowing, on one hand, a further increase of the effectiveness of the protection offered by the device (including using different thresholds calculated on the basis of statistics) but also, on the other hand, the addition of new fonctionalities being particularly advantageous.

For example, in one specific embodiment, the lamp also has special software program achieving recognition of the face of an authorized user. Therefore, it becomes possible, by means of a comparison test between the user's face and a stored image, to prevent unauthorized use of the lamp. One can thus achieve a very effective anti-theft device since it will no longer be possible for a third party to use the lamp without the permission of the original owner, who can enable or disable the function.

It is worth noting that, although the infrared detector is combined to the image sensor, one can consider, in a completely independent manner, a control unit which only comprises one single image sensor, at the exclusion of any infrared detector.

Furthermore, one can also arrange a specific integrated circuit achieving both the image capture function together with the imaging processing so that we will have at the output of integrated circuit, a logical signal that is representative of the presence of a human face and which can be forwarded to the control unit.

The invention claimed is:

1. A portable lighting lamp configured under the form of a headlamp comprising:
one or more LEDs:
a controllable power module providing power to LED lamps,
a control module for adjusting the light generated by the lamp,
characterized in that said control unit includes an image sensor generating images of the illuminated area of the lamp, said image sensor having an axis which corresponds to the axis of the LEDs, and a processor for processing images so as to detect the presence of an eye in a presumably dangerous area, said control module generating a control signal applied to said controllable power module for reducing the amount of light generated by the LEDs upon detection of a human face, in particular of an eye in said presumably dangerous area.

2. The portable lighting lamp according to claim 1 characterized in that said control module determines the relative surface of a human face on the image captured by said image sensor and performs a reduction of the intensity in accordance with the determined relative surface.

3. The portable lighting lamp according to claim 1 further comprising a USB interface for the connection to a computer or a microcomputer.

4. The portable lighting lamp according to claim 1 characterized in that the decrease of the light intensity and the return to normal intensity of the light is performed with distinct profiles under control of said control unit.

5. The portable lighting lamp according to claim 1 characterized in that a reference image is stored within the memory accessible to the microprocessor in order to store an image of an authorized user of the lamp, and to allow the operation only after comparing the image captured by said sensor with said reference image.

6. The portable lighting lamp according to claim 1 further comprising a infrared detector operating in a spectrum distinct from that of the LED, said infrared detector providing additional information to the control unit.

7. The portable lighting lamp according to claim 1 characterized in that it comprises a single integrated circuit for capturing and for processing image for the detection of a human face, said integrated circuit providing a logic information being representative of the detection of a human face which is transmitted to said control unit.

8. A process for limiting the intensity of light generated by a headlamp comprising
one or more LEDs
a controllable power module providing power LED lamps,
a control module for adjusting the light generated by the lamp,
said process being characterized in that it comprises the steps:
supplying current to one or more LEDs using a controllable power module, capturing an image by means of an image sensor having an axis corresponding to the axis of the LEDs, processing said image so as to detect a human face and more specifically an eye likely to be located in an presumably dangerous area for receiving a high density of luminous flux, said detection causing the generation of an information transmitted to said controllable power module, and
causing said controllable power module receiving said information to reducing the power emitted by the LED in response to detection of an eye in said dangerous area.

9. The process according to claim 8 characterized in that it comprises the steps of:
determining the relative area of a human face on the image captured by said image sensor, and
reducing the light intensity based on said determined surface area.

10. The process according to claim 8 characterized in that the decrease of the light intensity and the return to normal intensity of the light is performed with distinct profiles.

11. The process according to claim 8 characterized in that it further comprises the steps of:
storing a reference image within the memory accessible to the microprocessor corresponding to an authorized user of the lamp, and
authorizing the operation of the lamp only fater a comparison of such image with the image captured by the image sensor picture.

12. The process according to claim 8, wherein a lighting lamp is configured under the form of a headlamp and comprises:
one or more LEDs:
a controllable power module ensuring the power supply to the LED lamps,
a control module for adjusting the light generated by the lamp,
an infrared sensor operating within a spectrum distinct from that used by the LED for the detection of a human face, said control module generating a control signal being transmitted to said controllable power module for reducing the amount of light generated by the LED upon detection of a human face.

13. The process according to claim 12 wherein the lighting lamp is characterized in that said control module includes a microprocessor-based architecture with digital memory for processing the information generated by the infrared detector.

14. The process according to claim 12 wherein the lighting lamp is characterized in that said control module further comprises an image sensor generating an image that is processed to generate a confirmation information of the drop of luminous intensity of the LED.

15. The portable lamp according to claim 1 wherein a process for limiting the intensity of light generated by a lamp comprising one or more LEDs, a controllable power unit for supplying current to the LED lamps and a control module for adjusting the light generated by the lamp,
is characterized in that said control unit includes an image sensor generating images of the illuminated area of the lamp, said image sensor having an axis which corresponds to the axis of the LEDs, and a processor for processing images so as to detect the presence of an eye in a presumably dangerous area, said control module generating a control signal applied to said controllable power module for reducing the amount of light generated by the LEDs upon detection of human face, in particular of an eye in said presumably dangerous area
said process comprising the steps of:
detecting a human face by means of an infrared sensor operating within a spectrum distinct from that used by the LEDs and generating information representative of the detection of a human face;
transmitting said information to said controllable power unit;
in response to said detection, causing said controllable power unit to reduce the amount of light generated by the LED.

16. The portable lamp according to claim 15 wherein the process for limiting the intensity of light is characterized in that it further comprises capturing and processing an image, and in that the infrared detection is used to cause a rapid decrease in light intensity, followed by a confirmation of the drop intensity performed by means of digital processing of the image captured by said image sensor.

* * * * *